Figure 1:
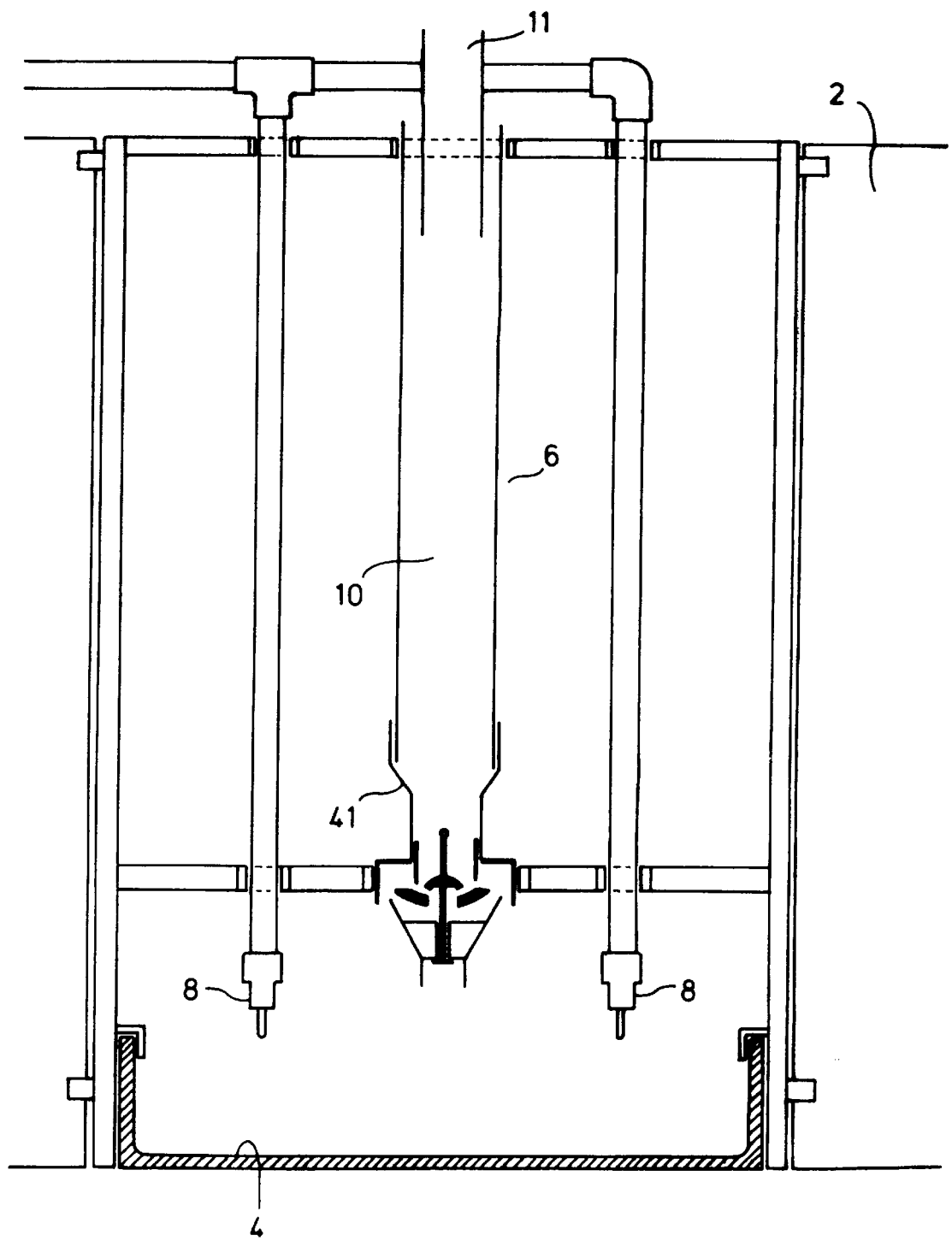

United States Patent [19]
Kaspersen

[11] Patent Number: 5,829,385
[45] Date of Patent: Nov. 3, 1998

[54] FEEDING DEVICE, IN PARTICULAR FOR PIGS

[75] Inventor: Peter Kaspersen, Horsens, Denmark

[73] Assignee: Agro Products ApS, Horsens, Denmark

[21] Appl. No.: 836,974

[22] PCT Filed: Nov. 28, 1995

[86] PCT No.: PCT/DK95/00479

§ 371 Date: May 28, 1997

§ 102(e) Date: May 28, 1997

[87] PCT Pub. No.: WO96/16537

PCT Pub. Date: Jun. 6, 1996

[30] Foreign Application Priority Data

Nov. 28, 1994 [DK] Denmark .................................. 1357/94

[51] Int. Cl.[6] .................................................. A01K 5/00
[52] U.S. Cl. .......................................... 119/54; 119/57.91
[58] Field of Search ......................... 119/53.5, 54, 57.91, 119/75

[56] References Cited

U.S. PATENT DOCUMENTS

| | | | |
|---|---|---|---|
| 1,346,027 | 7/1920 | Hiner et al. ............................. | 119/53.5 |
| 1,553,502 | 9/1925 | Boyes ...................................... | 119/53.5 |
| 3,780,701 | 12/1973 | Wentworth, Sr. ................... | 119/53.5 X |
| 4,270,489 | 6/1981 | Joronen ................................. | 119/54 X |
| 4,719,875 | 1/1988 | Van Gilst ............................... | 119/53.5 |
| 4,799,455 | 1/1989 | O'Kelley ............................ | 119/53.5 X |
| 4,945,859 | 8/1990 | Churchwell ........................... | 119/54 X |

*Primary Examiner*—Michael J. Carone
*Assistant Examiner*—Elizabeth Shaw
*Attorney, Agent, or Firm*—Sixbey, Friedman, Leedom & Ferguson; David S. Safran

[57] ABSTRACT

A feeding device, in particular for pigs, of the kind comprising a feed container (10) with a tubular outlet and preferably connected to a tubular transporter, by means of which the feed is brought to the feeding device, and where the pigs may act on the lower part of the tube (10) with their snouts for delivery of the feed into a trough (4). The feeding device is particular in that the lower part of the tube (10) is shaped as a separate deflectably suspended part and where there is provided between this and the lower edge of the fixed part of the tube a portioning device, through which the feed is supplied when the deflectable part is deflected.

16 Claims, 3 Drawing Sheets

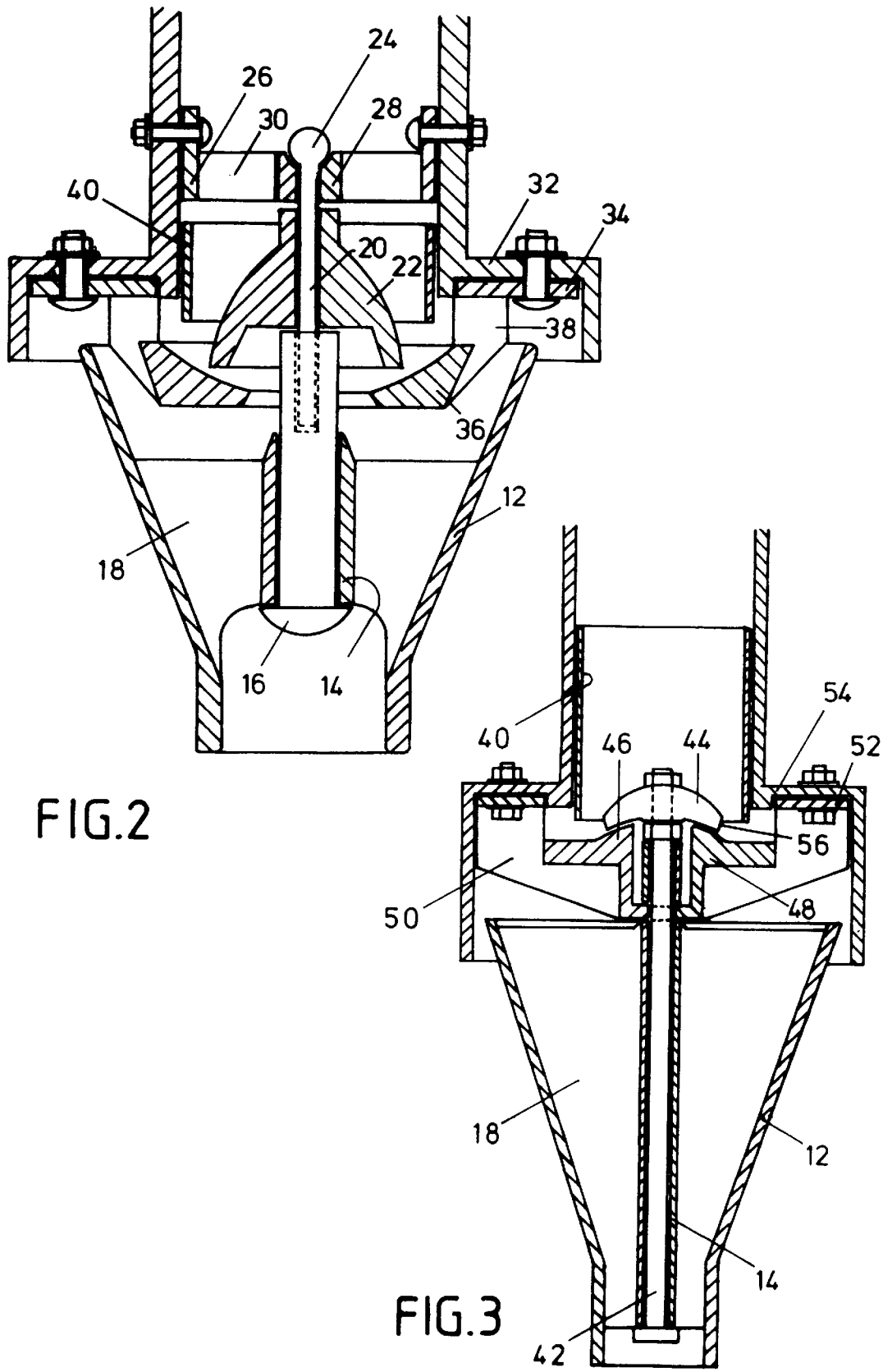

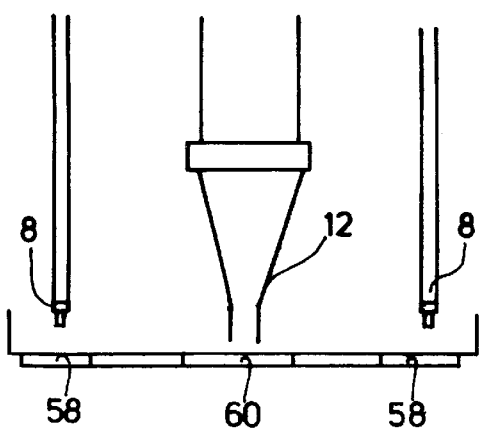
FIG.4
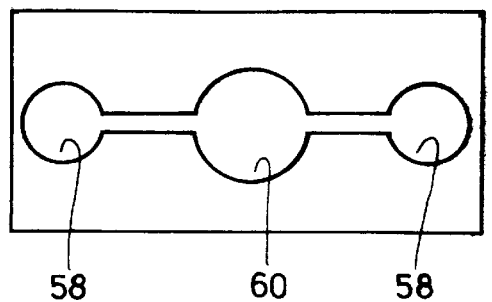
FIG.5
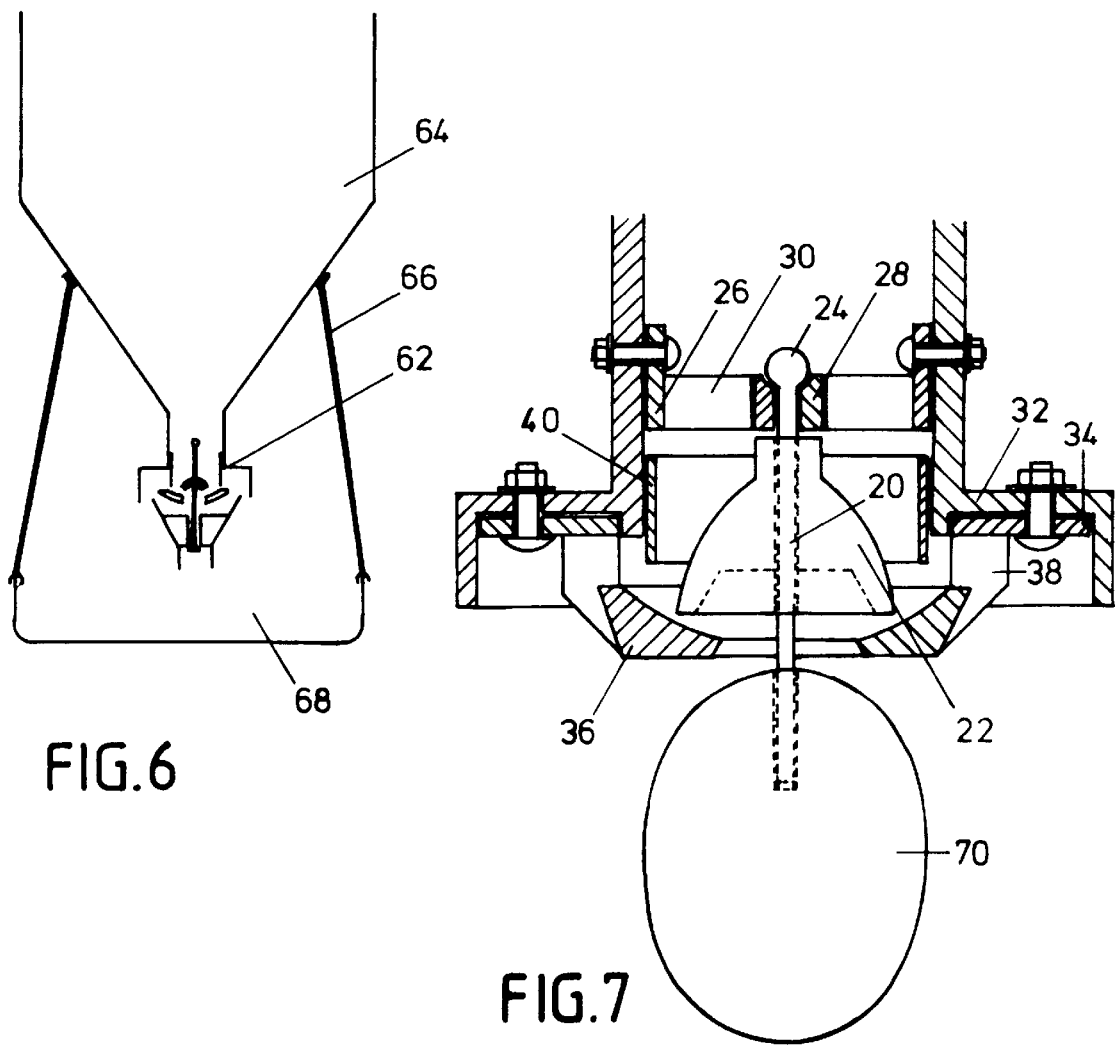
FIG.6
FIG.7

FEEDING DEVICE, IN PARTICULAR FOR PIGS

The present invention relates to an automatic feeding device, in particular for pigs and of the kind which comprises a vertical tubular feed container, preferably connected to a tubular conveyor, by which the feed is brought to the device, and where the pigs may act on the lower part of the tube with their snouts in order to obtain feed.

Such automatic feeding devices are known from e.g. WO93/13652, FR patent 2 660 155, and DE patent 26 52 788. It is common to these feeding devices that a hung tube as such or the lower part of such a tube may be bent sideways in order to deliver feed. It is obvious that the tube is strongly prone to fatigue fracture due to the repeated sideways bending which is further aggravated by the fact that the treatment by the pigs is particularly rough.

By the invention there is prescribed a construction where the lower part of the tube is provided in the form of a separate deflectably suspended section, and where there is provided between this section and the lower part of the fixed part of the tube a doseage device activated by the deflectable section in order to deliver feed through an outlet upon activation of the deflectable section. In this construction, fatigue fracture of the tube is avoided, because it is held against bending. Furthermore, the automatic feeding device is easier to use by the pigs, as they only need to act on a deflectable section and are not required to bend the tube as such.

An embodiment of the invention is particular in that the section, preferably in the shape of a funnel-shaped unit with a suspension rod, is deflectably suspended in the outlet, in that the rod has a spherical element, in particular a ball resting in a corresponding depression in the suspension, and on which suspension rod there rests a bell-shaped distribution body, and below said distribution body there is disposed a circumferential ring which carries the feed and such that the feed is pushed over the edge of the carrying ring due to the movements of the distribution body.

Another embodiment is particular in that the suspension rod for the deflectable section has its free end suspended in a spherical bearing where the lower side of the upper part is concave, in particular like a spherical surface, and rests on a protrusion with a corresponding convex surface on a plate which carries the feed and such that the feed is pushed over the edges of the carrying plate due to the movements of the upper part in the spherical bearing.

It is noted that the bearing surfaces do not necessarily need to be spherical, they may also be cylindrical. When the deflectable section is tubular, preferably funnel-shaped, the portion of feed will predominantly pass therethrough, but there is nothing to prevent that the deflectable section could be a fixed element where the feed slides down the outside.

By fitting a vertically displaceable cylindrical ring in the outlet of the tube, one may in a simple manner adjust the discharge of the portion of feed.

In an embodiment where the automatic feeding device comprises at least one drinking valve, the trough is shaped such that the water from the valve runs towards and below the outlet of the automatic feeding device. The water which is spilt when the pigs drink hence runs below the outlet of feed, whereby the pigs take up water simultaneously with their feeding. As the pigs lick the trough clean after feeding, there is no risk of harmful growth of bacteria in feed leftovers.

Control of the amount of feed on a supervisory level, where the feed is brought forward in a tubular conveyor may be obtained in that the discharge tube from the from the tubular conveyor is constituted as a telescoping tube which may be brought to dip more or less into the feed container, whereby the amount of feed therein may be controlled.

The discharge flow may be further controlled in that the automatic feeding device comprises means for adjusting the distance between the discharge of the automatic feeding device and the bottom of the trough; the shorter the distance, the less flow of feed and vice versa.

In an embodiment the doseage device is fitted to the discharge of an in particular funnel shaped feed container supported on a feed trough.

The invention will be described in greater detail in the following with reference to the appended drawing, in which FIG. 1 shows a feed location seen directly frontally, FIG. 2 shows a cross section through a doseage device for the automatic feeding device, FIG. 3 shows a cross section through a different embodiment of the automatic feeding device according to the invention, FIG. 4 shows a cross section through a particular embodiment for a trough, FIG. 5 shows the trough seen from above, FIG. 6 shows another embodiment of the automatic feeding device according to the invention, and FIG. 7 shows a cross section through a doseage device for the automatic feeding device with a fixed deflectable section.

The feed location shown in FIG. 1 is fitted into the divider 2 between two pigpens. The feed location comprises a trough 4, and centrally above this there is an automatic feeding device 6 which the pigs may activate by means of their snouts for a doseage of feed into the trough. On either side of the automatic feeding device there is arranged a drinking valve 8 which may similarly be activated by the snout in order to deliver water.

The automatic feeding device 6 comprises a tubular feed container 10 which is filled via the discharge tube 11 from a tubular conveyor which carries the feed round the stables. At the lower end of this tubular container there is fitted a doseage device which is shown in larger scale in FIG. 2.

The device comprises a deflectably carried activiation device in the form of a funnel-shaped body 12 with an inside tubular bush 14 for a connection bolt 16. The funnel 12 is carried by the bolt in that the bush 14 rests on the head of the bolt. The bush is connected to the funnel by means of radial struts 18, i.e. the funnel is open so that the feed may freely fall through it. Bridging of the feed in the funnel is quickly dissolved when the pigs act on it. In the upper part of the bolt thre is an inside thread so that it can be screwed to a suspension rod 20. Above the connection bolt and resting on its end there is a bell-shaped distribution body 22, where the suspension rod is fitted in a hole. At the top the suspension rod has a ball 24 which rests in a corresponding depression in a suspension fitted in the doseage device. The suspension comprises a circumferential ring 26 and a central part 28 which are connected by spokes 30 so that the feed may pass unhampered. The movements in the doseage device will similarly prevent or dissolve bridging of the feed.

Above the funnel 12 there is a collar 32, on the lower side of which there is bolted, by means of a flange 34, a guide- and carrying ring 36. The collar 32 furthermore acts as a cover shield, so that the pigs cannot get at the funnel 12 from above, but are forced to activate it from the side. The ring 36 is connected to the flange by means of spokes 38. Furthermore there is fitted a ring 40 in the discharge opening which may be raised or lowered in order to adjust the size of the discharge slit. The ring may be fitted by means of bolts passing through oblong holes which permit the vertical movement. The holes may be inclined whereby a possibility for finer adjustment is obtained.

The feed in the tubular container falls into the doseage device thorugh the funnel-shaped connection 41 (FIG. 1) to the container and further down until it hits the outside of the distributor 22, is deflected by it down onto the ring 36 where it will rest. When a pig activates the funnel 12 to deflect it, e.g. to the left on the figure, the lower edge of the distributor 22 will push feed over the upper edge of the ring 36, whereby it falls down the funnel 12 and further down into the trough. Furthermore feed will flow over the inside edge of the ring 36 when the distributor 22 moves to the left. When the pig lets go of the funnel 12 it swings back to its original position, whereby feed will be pushed over the top edge on the opposite side, where it falls down into the funnel and into the trough. The pendular movement loosens possible bridging of the feed in the doseage device so that it falls freely into the trough.

The amount delivered may be controlled by means of the ring 40 as well as by raising or lowering the ring 36, in case it becomes necessary, so that the distance between this and the distribution device 22 becomes larger or smaller. Furthermore the funnel 12 may be raised or lowered.

In FIG. 3 a cross section is shown in another embodiment of the doseage device according to the invention, where the major difference as compared to the earlier example is the way the funnel is suspended. As above the funnel 12 has a central tubular bush 14 carried by spokes 18, and the funnel is hung on a bolt taken through the bush. The funnel may deflect because it is suspended in a spherical bearing. One bearing surface is formed in an end piece 44 fitted to the upper end of the bolt by means of a nut. The lower side of the end piece is concave like a spherical surface and rests on a protrusion 46 with a corresponding convex spherical surface on another endpiece which in this case is plate-shaped. The plate-shaped end piece 48 is fitted to a collar 54 by means of an open spoke structure 50 with a flange 52 similarly to the above example. the ring 40, the height of which may adjusted to control the discharge opening is equally found.

The feed in the tubular feed container rests on the circular end piece 48 and the moveable part 44 of the spherical bearing. When the funnel 12 is activated to deflect, e.g. to the left in the drawing, the bearing part 44 with the fairly high edge 56 pushes feed over the edge of the plate 48, so that it falls into the funnel and further into the trough. As the funnel swings back, feed will be pushed over the other edge of the plate 48. The movement will simultaneously clean the bearing surfaces so that no feed gets wedged in.

The difference between the two constructions is that the centre of rotation for the funnel in the embodiment shown on FIG. 2 is disposed in the tube, whereas the centre of rotation in the embodiment shown in FIG. 3 is disposed below the tube—the actual placement is dependent on the radius of curvature of the spherical bearing.

As it is shown on FIG. 1, the doseage device, or more precisely, the lower edge of the funnel, is raised fairly high above the trough. In another embodiment shown on FIG. 4 the funnel has been lengthened so that it ends somewhat above the bottom of the feed trough 4. In the example shown, the trough is given a particular shape, with a flat depression 58 below each watering valve 8 connected to a similarly flat and larger depression 60 below the discharge from the automatic feeding device. This ensures that the water which the pigs have not drunk runs down into the depression and along the passage to the larger depression, into which the feed falls, and the water meets the feed. It has been demonstrated that newly weaned piglets find it easier to learn to drink from a watering valve this way. The proximity between the discharge of the automatic feeding device and the bottom of the trough causes the pigs to lick the feed and the water rather than eat it from a heap, which is considered the better feeding method.

A different embodiment of the invention is shown in FIG. 6 of the drawing, where the doseage device 62 is fitted to the discharge of a funnel-shaped feed container 64 which is supported by struts 66 on a feed trough 68, in which case the struts may be wall elements.

In FIG. 7 of the drawing, an embodiment is shown which corresponds to FIG. 2, with the difference that the funnel-shaped piece is replaced by a closed element 70, solid or hollow. Where the feed in the embodiment shown in FIG. 2 passes through the funnel 12 and is collected through the discharge, the feed in this case slides down the outside of the closed element 70 and is spread out somewhat more. Furthermore the feed runs down onto the pig's snout which is not the case with the funnel. The choice between the embodiments depends on the desired effect.

With the invention there is hence provided an efficient and dependable automatic feeding device which is also useful for feeding by licking, and which furthermore increases the capacity of newly-weaned piglets for drinking from a drinking valve.

I claim:

1. An automatic feeding device which comprises a feed container by which the feed is brought to the device, a separate, deflectably suspended section, and a feed dosing device which is activatable by movements of the deflectably suspended section and which is located between a lower part of the container and the deflectable suspended section; wherein the dosing device comprises a feed carrier plate and a laterally movable push-off body for effecting a successive pushing off of feed resting on the carrier plate and a filling up with feed of a free space of the carrier plate created during a returning movement of the pushing-off body; wherein the deflectable suspended section is deflectable suspended from within an outlet of the container by a suspension having a suspension rod; wherein the push-off body is provided on the suspension rod; and wherein the carrier plate has an annular ledge which carries the feed and is disposed below said push-off body such that the feed is pushed over an edge of the carrier plate by lateral movements of the push-off body.

2. An automatic feeding device according to claim 1, wherein the suspension rod has a spherical element resting in a corresponding depression in the suspension.

3. An automatic feeding device according to claim 1, wherein the suspension rod for the deflectable section has an end suspended in a spherical bearing; wherein a lower side of an upper part of the suspension rod is concave and rests on a rise with a corresponding convex surface on the feed carrier plate such that said upper part constitutes said push-off body and causes the feed to be pushed over the edge of the carrying plate in response to movements of the upper part on the spherical bearing.

4. An animal operated feeding device comprising:
   a feed container with an open bottom outlet opening and a feed carrier plate, said feed carrier plate being located spaced underneath said bottom outlet opening and having a feed delivery edge enabling feed to be delivered from the device in response to feed being pushed along said feed carrier plate towards and over said delivery edge;

a feed pushing member located at a top side of said feed carrier plate and supported by movable support means in a manner pushing feed on said feed carrier plate towards said delivery edge by a motion thereof toward the feed and said delivery edge, and stowing feed on said feed carrier plate by feed being allowed to descend from the feed container into an area vacated by the feed pushing member during return motion of the feed pushing member away from the feed and the feed delivery edge; and movable actuator means operatively engageable by animals and connected to said movable support means in a manner enabling production of a back-and-forth movement of the feed pushing member by the animals for delivery of feed from the device.

5. An animal operated feeding device according to claim 4, wherein means for suspending the movable support means in a manner enabling deflection thereof in all lateral directions is provided.

6. An automatic feeding device according to claim 5, wherein the movable actuator means is a funnel-shaped unit with a suspension rod deflectably suspended from a suspension member within the container outlet; and where the feed pushing member is bell-shaped.

7. An automatic feeding device according to claim 6, wherein a vertically displaceable cylindrical ring is fitted into the outlet opening of the feed container, close to a mouth thereof, as a means for adjusting the size of the outlet.

8. An automatic feeding device according to claim 7, wherein a vertically displaceable cylindrical ring is fitted into the outlet opening of the feed container, close to a mouth thereof, as a means for adjusting the size of the outlet.

9. An automatic feeding device according to claim 7, further comprising a telescoping discharge tube from a tubular conveyor which leads into the feed container to an adjustable extent, said discharge tube being a means for controlling the amount of feed in the feed container.

10. An automatic feeding device according to claim 6, wherein the suspension rod has an end suspended in a spherical bearing of the suspension member; wherein the feed pushing member is formed by an upper part on the suspension rod; and wherein a lower side of the upper part is concave and rests on a corresponding convex surface on the feed carrier plate.

11. An automatic feeding device according to claim 10, wherein the movable actuator means is a funnel-shaped unit with a suspension rod deflectably suspended from a suspension member within the container outlet; and where the feed pushing member is bell-shaped.

12. An animal operated feeding device according to claim 4, wherein a vertically displaceable cylindrical ring is fitted into the outlet opening of the feed container, close to a mouth thereof, as a means for adjusting the size of the outlet.

13. An animal operated feeding device according to claim 4, further comprising a telescoping discharge tube from a tubular conveyor which leads into the feed container to an adjustable extent, said discharge tube being a means for controlling the amount of feed in the feed container.

14. An automatic feeding device according to claim 4, wherein the feed container is supported on a feed trough.

15. An automatic feeding device according to claim 4, wherein the movable actuator means comprises a deflectable closed element.

16. An automatic feeding device according to claim 15, the closed element is spherical.

\* \* \* \* \*

UNITED STATES PATENT AND TRADEMARK OFFICE
CERTIFICATE OF CORRECTION

PATENT NO. : 5,829,385
DATED : November 3, 1998
INVENTOR(S) : Peter Kaspersen

It is certified that error appears in the above-identified patent and that said Letters Patent is hereby corrected as shown below:

<u>Title page,</u>
Item [73], Assignee, delete "Agro Products ApS" add -- Agro Products A/S --.

Signed and Sealed this

Eighteenth Day of February, 2003

JAMES E. ROGAN
*Director of the United States Patent and Trademark Office*